United States Patent [19]
Gilmour et al.

[11] Patent Number: 5,515,337
[45] Date of Patent: May 7, 1996

[54] MULTIBEAM SIDE-LOOK SONAR SYSTEM GRATING SIDE LOBE REDUCTION TECHNIQUE

[75] Inventors: George A. Gilmour, Severna Park; James L. Meyers; Leslie M. James, both of Baltimore, all of Md.

[73] Assignee: Westinghouse Electric Corporation, Pittsburgh, Pa.

[21] Appl. No.: 425,550

[22] Filed: Apr. 20, 1995

[51] Int. Cl.$^6$ .................................................. G01S 15/89
[52] U.S. Cl. .............................................. 367/88; 367/905
[58] Field of Search .............................. 367/88, 905, 105

[56] References Cited

U.S. PATENT DOCUMENTS

| | | | |
|---|---|---|---|
| 4,802,148 | 1/1989 | Gilmour | 367/88 |
| 4,987,563 | 1/1991 | Gilmour | 367/88 |
| 5,033,029 | 7/1991 | Jones | 367/88 |
| 5,177,710 | 1/1993 | Gilmour et al. | 367/88 |

*Primary Examiner*—Daniel T. Pihulic

[57] ABSTRACT

A multibeam side-look sonar system includes a projecting transducer that projects a beam of acoustic energy to insonify a target area and a receiving transducer having a plurality of transducer elements arranged in a linear array. Each of the transducer elements generates a beam signal in response to acoustic energy reflected from the target area. A beamforming circuit, coupled to the receiving transducer, processes the beam signals generated by the transducer elements to form a beam pattern. The beam pattern for an end beam on the receiving transducer has a main lobe and grating side lobes. One of the grating side lobes may be insonified by the projected beam of acoustic energy. A shading circuit, coupled between the receiving transducer and the beamforming circuit, amplifies the beam signals with respective gains, and adjusts each of the respective gains to reduce an amplitude level of the grating side lobe insonified by the projected beam of acoustic energy.

9 Claims, 10 Drawing Sheets

MULTIBEAM SIDE-LOOK SONAR SYSTEM GRATING SIDE LOBE REDUCTION TECHNIQUE

BACKGROUND OF THE INVENTION

1. Field of the Invention

The present invention relates to side-look sonar systems, and more particularly to multibeam side-look sonar systems.

2. Description of Related Art

In a multibeam side-look sonar system, a projecting transducer transported on the side of an underwater carrier vehicle projects a beam of acoustic energy to insonify a narrow target area. The target area reflects acoustic energy back to a receiving transducer also transported on the carrier vehicle. The receiving transducer typically is divided into a plurality of individual transducer elements arranged in a linear array. In response to the acoustic energy reflected from the target area, the transducer elements generate beam signals that effectively provide a spatial sampling of the acoustic energy received along the aperture of the transducer array. A beamforming circuit processes the beam signals generated by the transducer elements to form a beam pattern centered on a particular transducer element in the linear array. The distance separating the center points of adjacent transducer elements causes repetitions of the wave of acoustic energy along the aperture of the array. When the beamforming circuit forms a beam pattern for a particular set of transducer elements, the repetitions caused by the distance between the transducer elements form grating side lobes in the beam pattern. The grating side lobes are formed at angles relative to a main lobe in the beam pattern, in directions in which there is a one wavelength difference in the arrival of the reflected acoustic energy between adjacent transducer elements in the linear array.

Beam patterns formed for transducer elements positioned near the center of the linear array are generally called "center beams," whereas beam patterns formed with respect to transducer elements positioned away from the center of the array are generally called "end beams." For a center beam, the beam pattern includes a main lobe within the target area insonified by the projecting transducer, and grating side lobes that tend to fall outside of the target area. At short range, the grating side lobes for the center beam generally continue to fall outside of, or "straddle," the narrow target area. However, the beam pattern for an end beam may include a grating side lobe that falls within the insonified target area. For short range targets, in particular, one of the grating side lobes for the end beam invariably falls within the target area. Unfortunately, when one of the grating side lobes is insonified, the side lobe signal is added to the main lobe signal blurring the sonar image. The resulting ambiguous beam pattern can seriously compromise the imaging performance of the side-look sonar system. Accordingly, there is a need for a multibeam side-look sonar system for reducing the effects of grating side lobes.

SUMMARY OF THE INVENTION

In light of the foregoing, the present invention is directed to a multibeam side-look sonar system that reduces the effects of grating side lobes.

Additional features and advantages of the invention will be set forth in part in the description that follows, and in part will be apparent from the description, or may be learned by practice of the invention. The objects and advantages of the invention will be realized and attained by the system particularly pointed out in the written description and claims hereof, as well as in the appended drawings.

To achieve the advantages of the invention and in accordance with the purpose of the invention, as embodied and broadly described herein, the present invention is a multibeam side-look sonar system comprising a projecting transducer for projecting a beam of acoustic energy toward a target area, a receiving transducer having a plurality of transducer elements arranged in a linear array, each of the transducer elements generating a beam signal in response to acoustic energy reflected from the target area, a beamforming circuit, coupled to the receiving transducer, for processing the beam signals generated by the transducer elements to form a beam pattern, wherein the beam pattern includes a main lobe and grating side lobes, one of the grating side lobes being insonified by the projected beam of acoustic energy, and a shading circuit associated with the receiving transducer and the beamforming circuit, for amplifying the beam signals with respective gains, and for adjusting each of the respective gains to reduce an amplitude level of the one of the grating side lobes insonified by the projected beam of acoustic energy.

It is to be understood that both the foregoing general description and the following detailed description are exemplary and explanatory only and are not restrictive of the invention, as claimed.

The accompanying drawings are included to provide a further understanding of the invention and are incorporated in and constitute a part of this specification, illustrate the embodiments of the invention and together with the description serve to explain the principles of the invention.

DETAILED DESCRIPTION OF THE INVENTION

Reference will now be made in detail to one embodiment of the invention, an example of which is illustrated in the accompanying drawings. Wherever possible, the same reference numbers will be used throughout the drawings to refer to the same or like parts. This embodiment is shown primarily for clarity. The preferred embodiment will accomplish the shading and beamforming by digitally sampling the signals.

In accordance with the present invention, there is provided a multibeam side-look sonar system for reducing the effects of grating side lobes. The multibeam side-look sonar system of the present invention includes a projecting transducer, a receiving transducer, a beamforming circuit, and a shading circuit.

Figure 1:
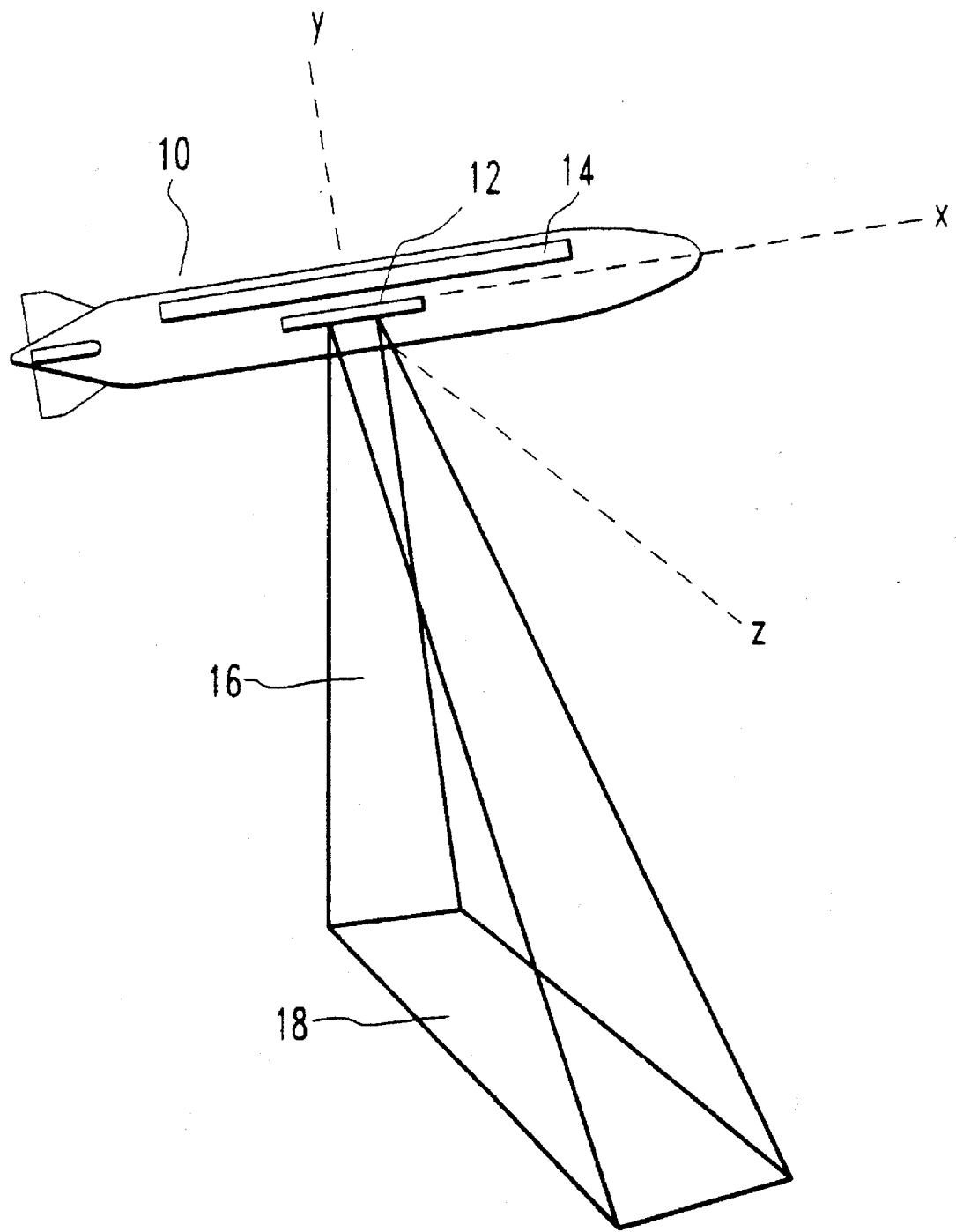
FIG. 1 is a perspective diagram illustrating an underwater search platform for transporting the multibeam side-look sonar system of the present invention.

FIG. 1 is an example of a search platform for transporting the multibeam side-look sonar system of the present invention. For sonar mapping, an underwater carrier vehicle 10, which may be self-propelled or towed by a surface vessel, transports both a projecting transducer 12 and a receiving transducer 14 of the system of the present invention. In some cases, the projecting and receiving transducers 12, 14 can be realized by the same sonar transducer, with the use of appropriate T/R switching. As the carrier vehicle 10 travels, the projecting transducer 12 projects a beam 16 of acoustic energy laterally to insonify a target area 18. The insonified target area 18 reflects a wave of acoustic energy that is received by the receiving transducer 14 and processed by a beamforming circuit to form an image of the target area.

Figure 2:
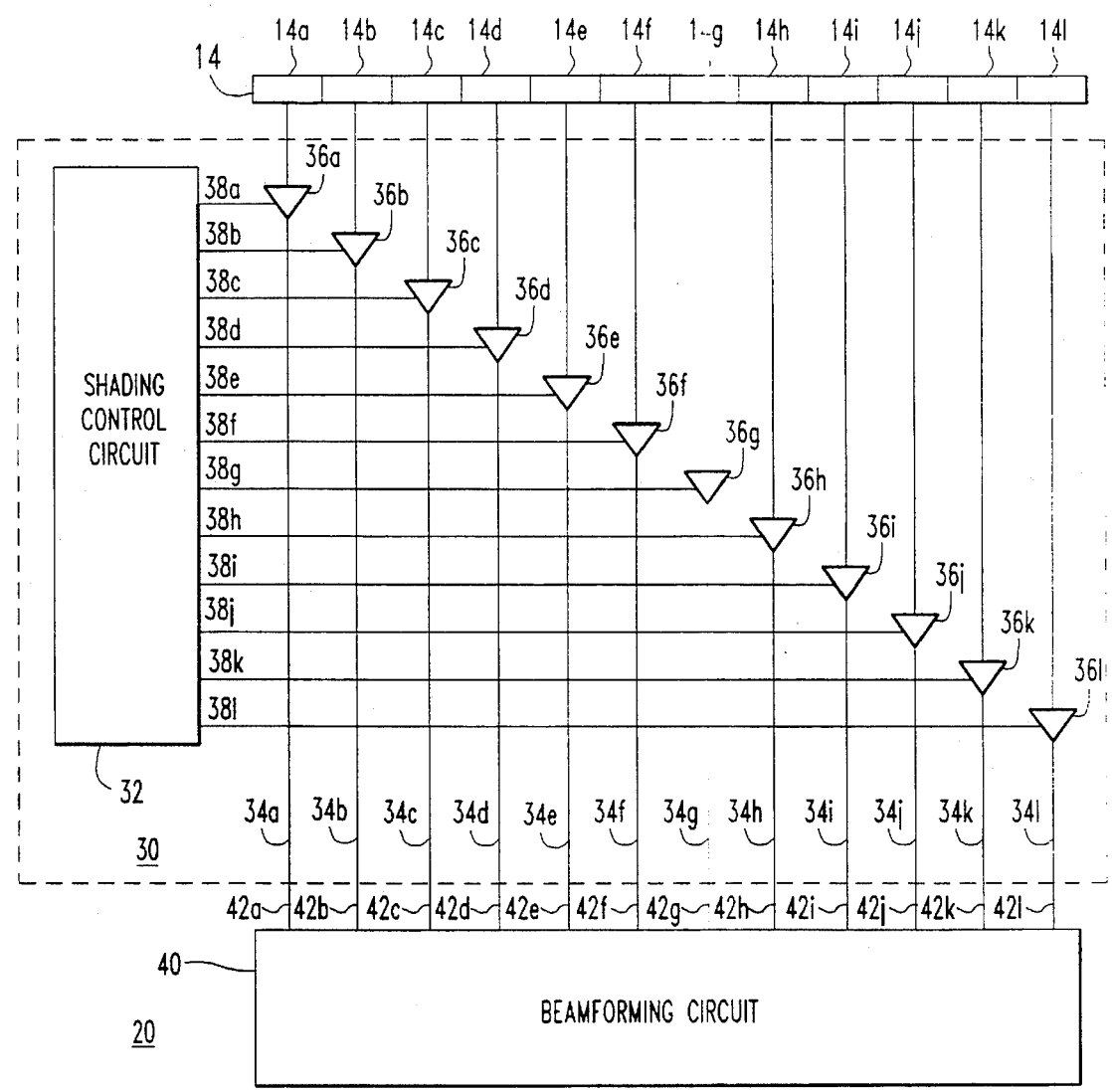
FIG. 2 is a block diagram illustrating one embodiment of a side-look sonar system for grating side lobe reduction, in accordance with the present invention.

Nearly any beamformer that has programmable shading coefficients can be used to implement the concept. A first exemplary embodiment of the multibeam side-look sonar system of the present invention is shown in FIG. 2, and designated generally by reference numeral 20. As herein embodied and shown in FIG. 2, the system 20 includes, in addition to the projecting transducer 12 shown in FIG. 1, a receiving sonar transducer 14 having a plurality of individual transducer elements 14a–14l arranged in a linear array. Each of the transducer elements 14a–14l generates a signal in response to the wave of acoustic energy reflected from target area 18. A shading circuit 30 includes a plurality of amplifier channels 34a–34l for amplifying the element signals. The amplifier channels 34a–34l, coupled between transducer elements 14a–14l and a beamforming circuit 40, include amplifiers 36a–36l that amplify the beam signals with respective gains. The beamforming circuit 40, having inputs 42a–42l coupled to the outputs of amplifiers 36a–36l, receives the amplified beam signals and processes them to form a beam pattern. The shading circuit 30 also includes a shading control circuit 32 having shading control outputs 38a–38l, coupled to amplifiers 36a–36l. The shading control circuit 32 adjusts the respective gains of amplifiers 36a–36l to weight, or "shade," the amplitudes of the beam signals generated across the aperture of the linear array. In accordance with the present invention, the shading control circuit 32 adjusts the gains to effect a shading that reduces an amplitude level of an insonified grating side lobe appearing in the beam pattern formed by beamforming circuit 40. Multiple beams are formed sequentially by stopping the shading outputs to conform to the beam being formed in the beamformer.

Figure 3:
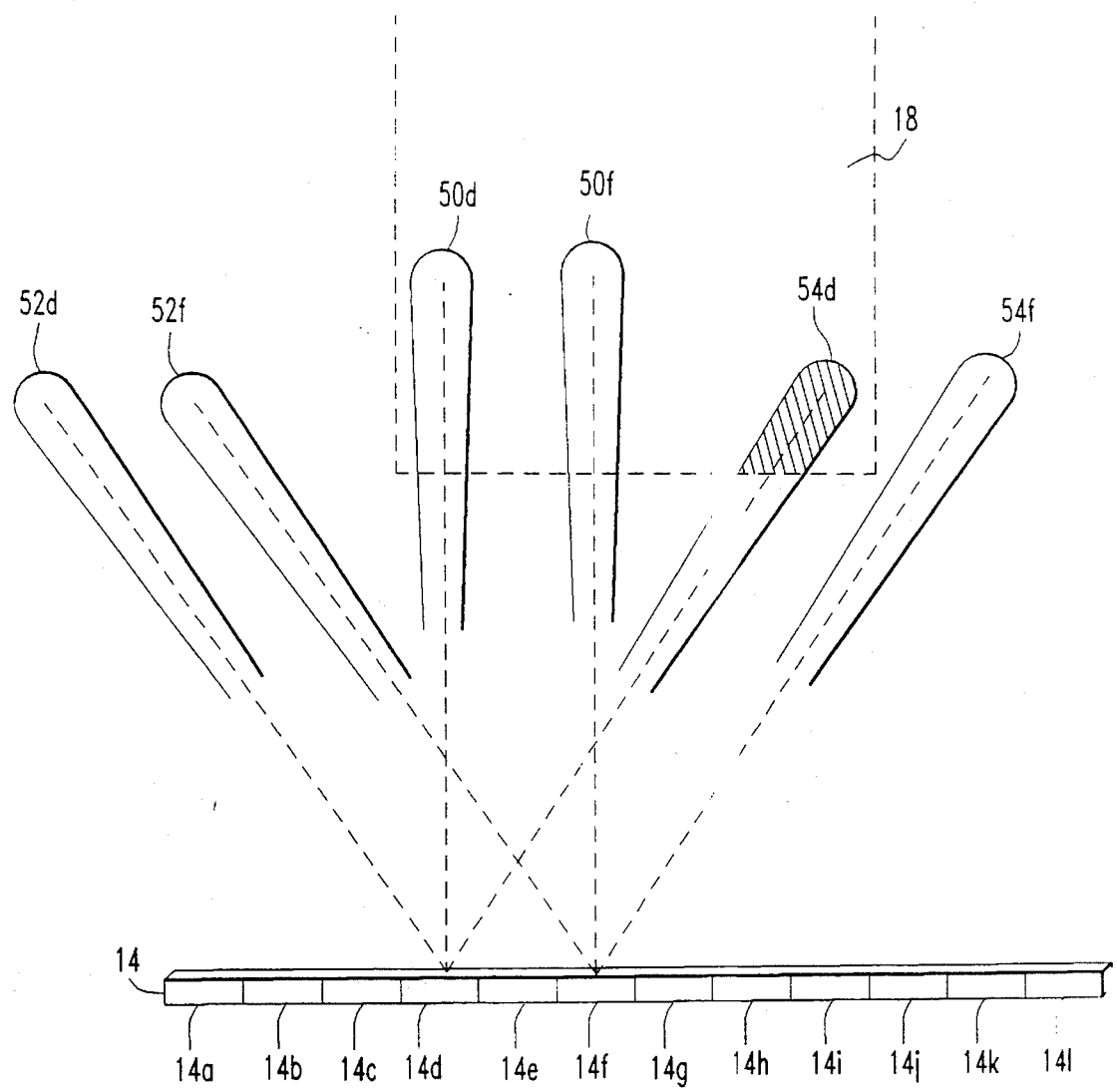
FIG. 3 illustrates the beamforming operation of a multibeam side-look sonar system.

FIG. 3 illustrates the beamforming operation of the receiving transducer 14, and the problems associated with grating side lobes in the beam pattern. When the beamforming circuit 40 processes the beam signals generated by transducer elements 14a–14l to form a center beam with respect to transducer element 14f, for example, the resulting beam pattern includes a main lobe 50f within the insonified target area 18, and grating side lobes 52f and 54f that fall outside of the target area 18, as shown in FIG. 3. When an end beam is formed at short range for transducer element 14d, the resulting beam pattern also includes a main lobe 50d within the insonified target area 18, and grating side lobes 52d and 54d. However, one of the grating side lobes 54d for the end beam also falls within the target area 18 and is insonified by the beam 16 of acoustic energy projected by the projecting transducer 12. As a result, the amplitude of the insonified grating side lobe 54d increases relative to the amplitude of the main lobe 50d.

Figure 4:
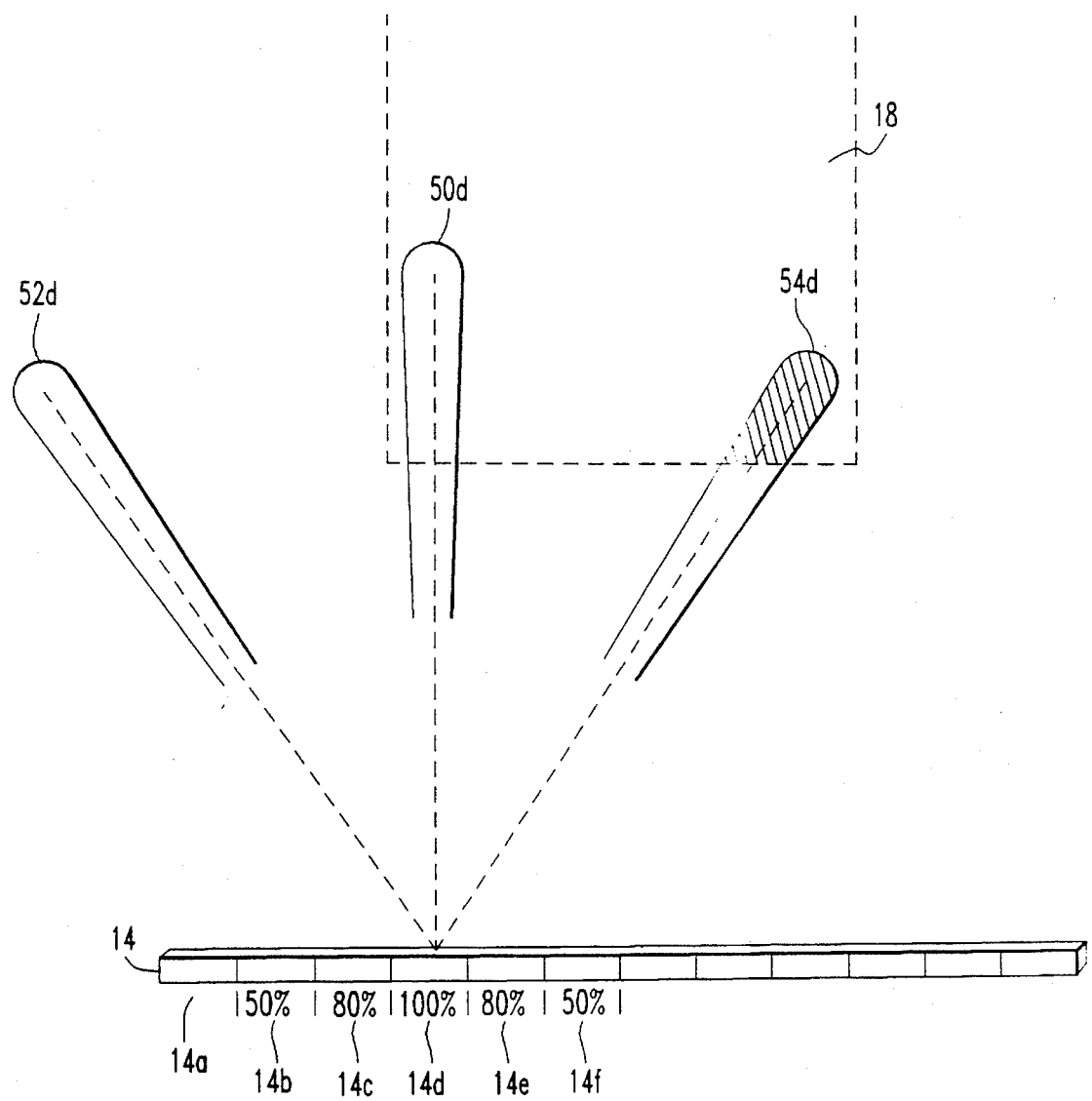
FIG. 4 illustrates a conventional beam signal shading technique.

A conventional shading scheme, illustrated in FIG. 4, weights the respective gains of the beam signals such that the beam signal generated by the transducer element on which the beam pattern is centered is amplified at a maximum gain, with the gain distribution for adjacent transducer elements being higher for those positioned toward the center of the array than for those positioned toward the end of the array. With respect to an end beam centered on transducer element 14d, for example, the conventional shading schemes adjusts the respective amplifier gains such that the beam signal generated by transducer element 14d is carried at a maximum gain (100% in FIG. 4). The beam signals generated by the adjacent transducer elements 14e and 14c is carried at a gain (80% in FIG. 4) slightly less than the maximum gain. The gains for the beam signals generated by the next adjacent transducer elements 14f, 14b are further decreased relative to the maximum gain (50% in FIG. 4). Thus, according to the conventional shading scheme, the weighting used for shading the elements is centered on the transducer element 14d that is centered on the beam 50d.

Figure 5A:
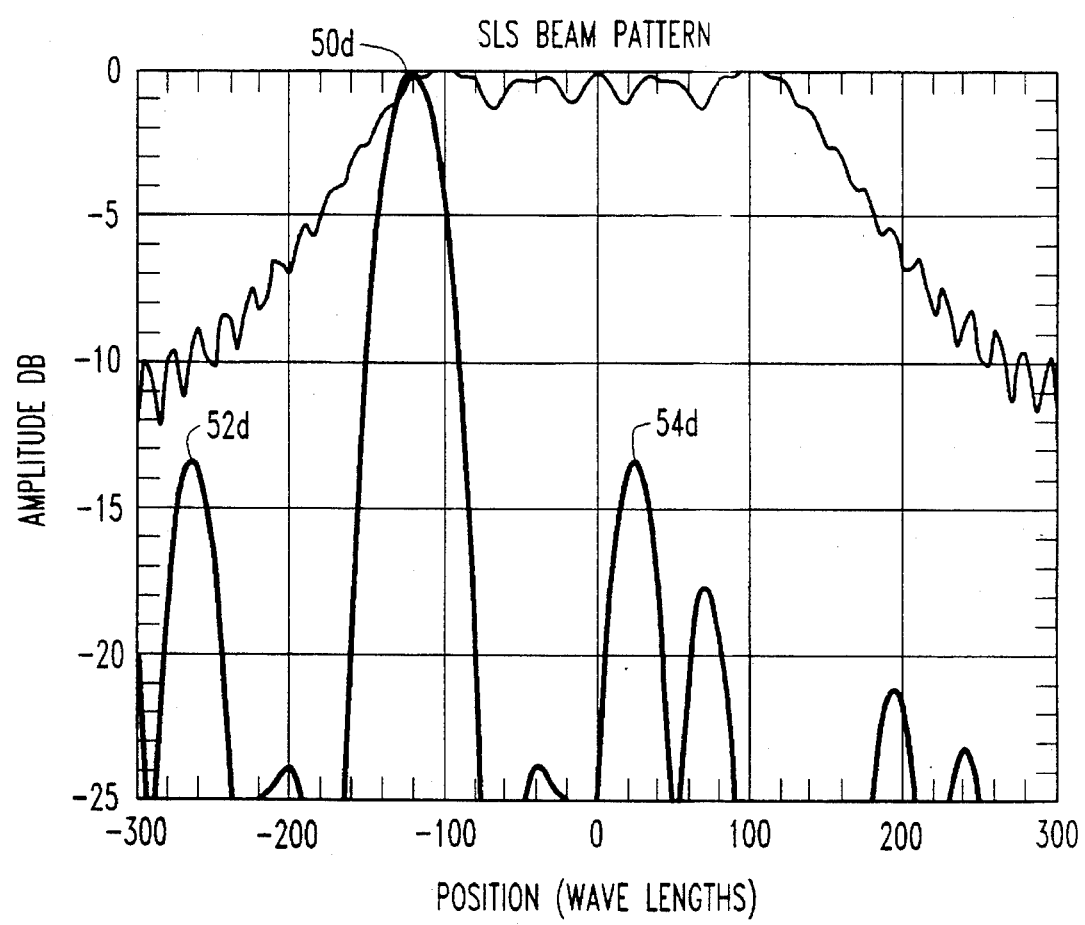
FIGS. 5A and 5B illustrate a receive beam pattern for an end beam transducer element in a multibeam side-look sonar system employing a conventional beam signal shading technique.
Figure 5B:
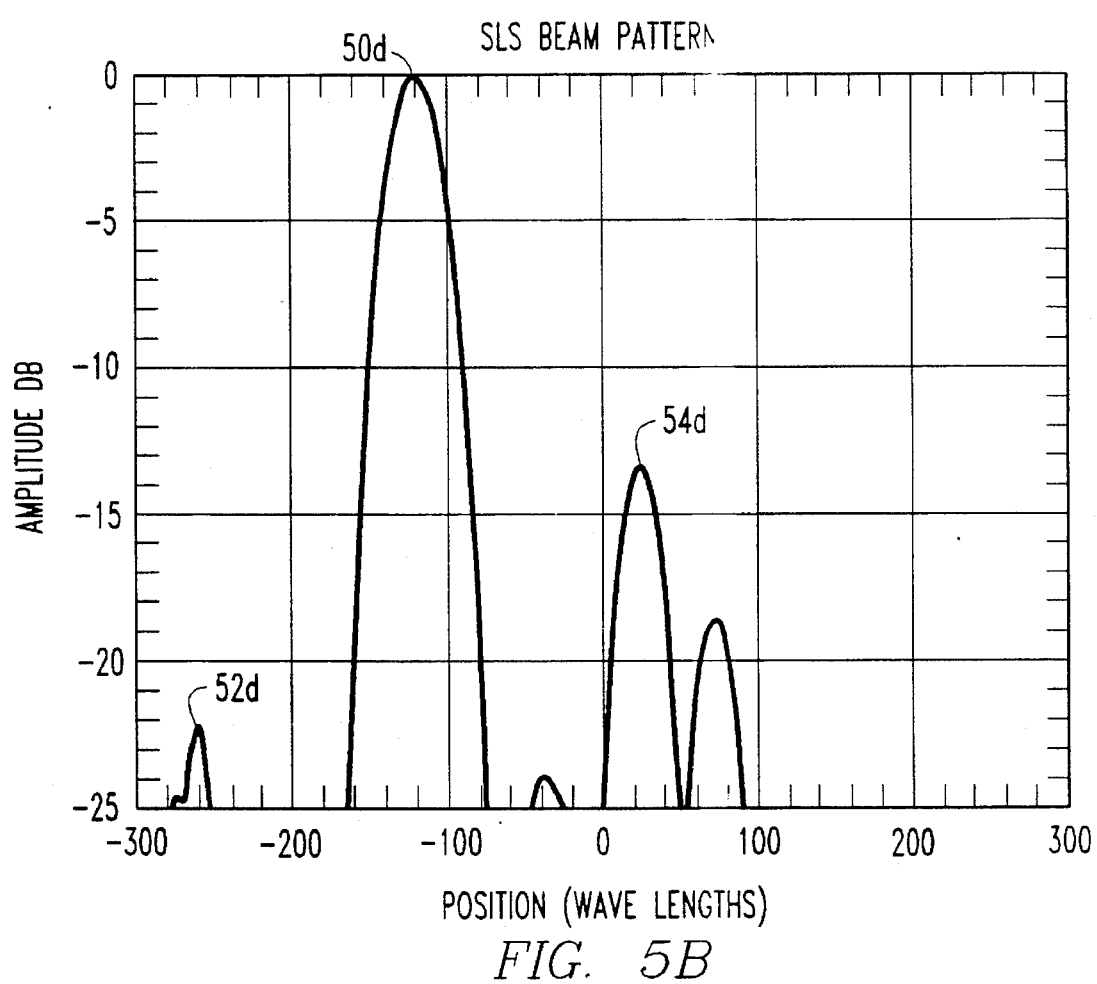

FIG. 5A shows the receive end beam pattern centered on element 14d overlaid on the transmit beam pattern and FIG. 5B shows the composite 2-way transmit/receive pattern for this beam, when the conventional shading scheme is employed. The beam pattersn are shown in decibels relative to the peak amplitude versus position in wavelengths of the sonar frequency. Thus, the end beam is centered on a position 120 wavelengths to the left of the center of the array (at 0 wavelengths). The beam patterns include the main lobe 50d, grating side lobe 52d, and the insonified grating side lobe 54d shown in FIG. 2. Grating side lobe 52d, falling outside of the target area 18, has an amplitude of approximately −22 dB relative to the main lobe 50d in FIG. 5B. However, the insonified grating side lobe 54d has a much higher relative amplitude of approximately −13 dB. Thus, with the conventional shading technique the insonified grating side lobe 54d degrades the image formed by the main lobe 50d due to the increased amplitude of the grating side lobe.

The shading control circuit 32 provided by the multibeam side-look sonar system 20 shown in FIG. 2 alleviates the effects of the insonified grating side lobe on the beam pattern formed by beamforming circuit 40. Specifically, the shading control circuit 32 adjusts the respective gains of amplifiers 36a–36l, via control outputs 38a–38l, to provide a shading that reduces the amplitude level of the insonified grating side lobe 54d within the beam pattern formed by beamforming circuit 40. The shading control circuit 32 provides an unbalanced shading that reduces the amplitude of the grating side lobe 54d within the insonified target area 18, while allowing the amplitude of the grating side lobe 52d that falls outside of the target area 18 to increase.

Figure 6:
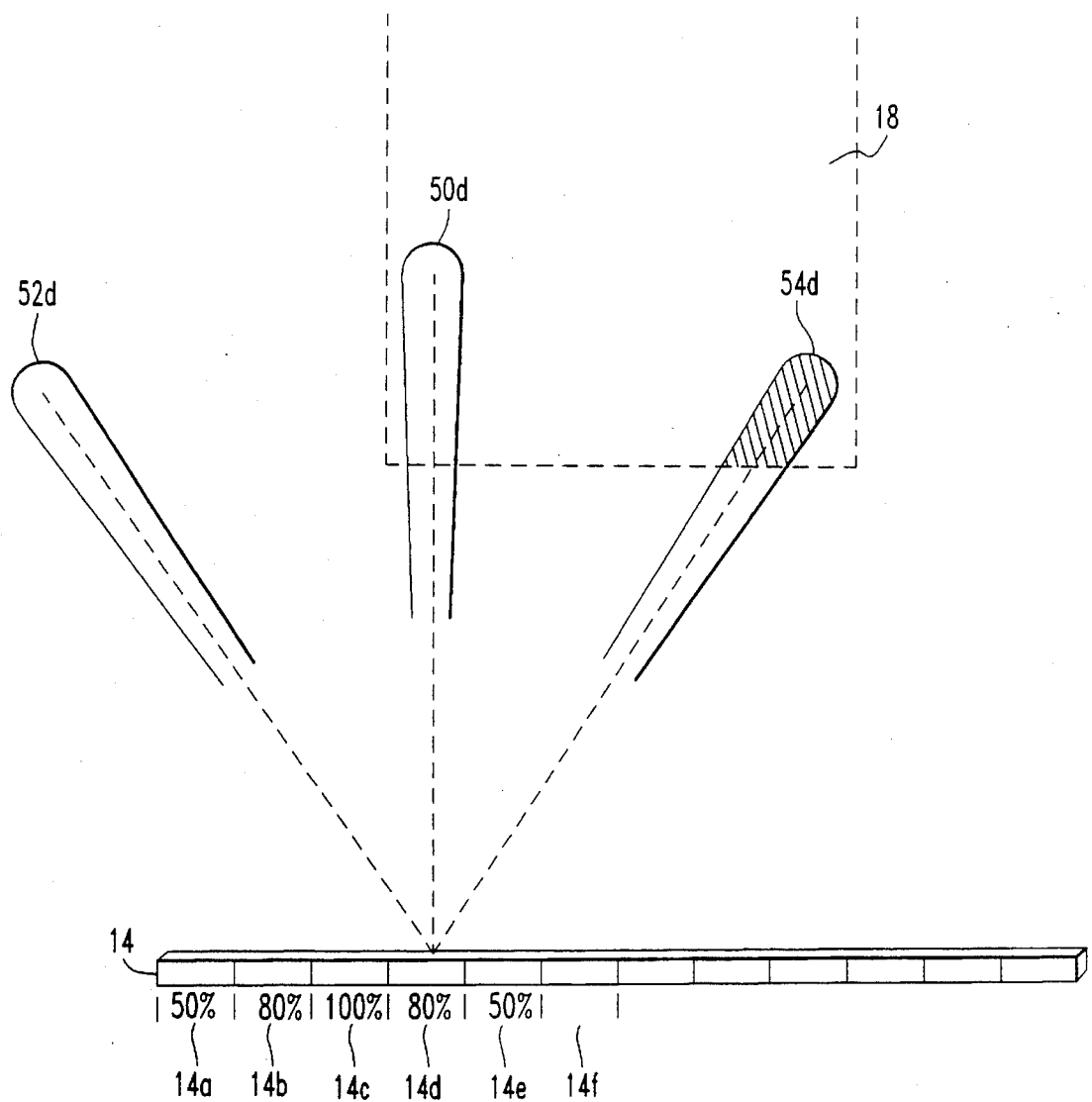
FIG. 6 illustrates a beam signal shading technique for grating side lobe reduction, in accordance with a multibeam side-look sonar system of the present invention.

As shown in FIG. 6, for example, the shading control circuit 32 adjusts the respective gains of amplifiers 36a–36l such that the beam signal generated by transducer element 14d, on which the main lobe 50d of the end beam pattern is substantially centered, is amplified with less than the maximum gain (80% in FIG. 6). The beam signal generated by the transducer element 14c positioned adjacent a side of transducer element 14d opposite the insonified grating side lobe 54d is amplified with a greater gain (100% in FIG. 6). The shading control circuit 32 further adjusts the gains of amplifiers 36a–36l such that the beam signal generated by the transducer element 14e positioned adjacent transducer element 14d on the same side as the insonified grating side lobe 54d is amplified with a lens gain (50% in FIG. 6). The gains of beam signals generated by the transducer elements 14a and 14b are amplified with substantial gains (50% and 80% in FIG. 6) since they are on the opposite side from the insonified grating side lobe. However, the beam signal generated by the transducer element 14f on the same side of the main lobe 50d as the insonified grating lobe 54d is given zero gain. Thus, according to the shading provided by the present invention, the gain distribution is greater for transducer elements on the side of the main lobe 50d opposite the insonified grating side lobe 54d.

Figure 7:
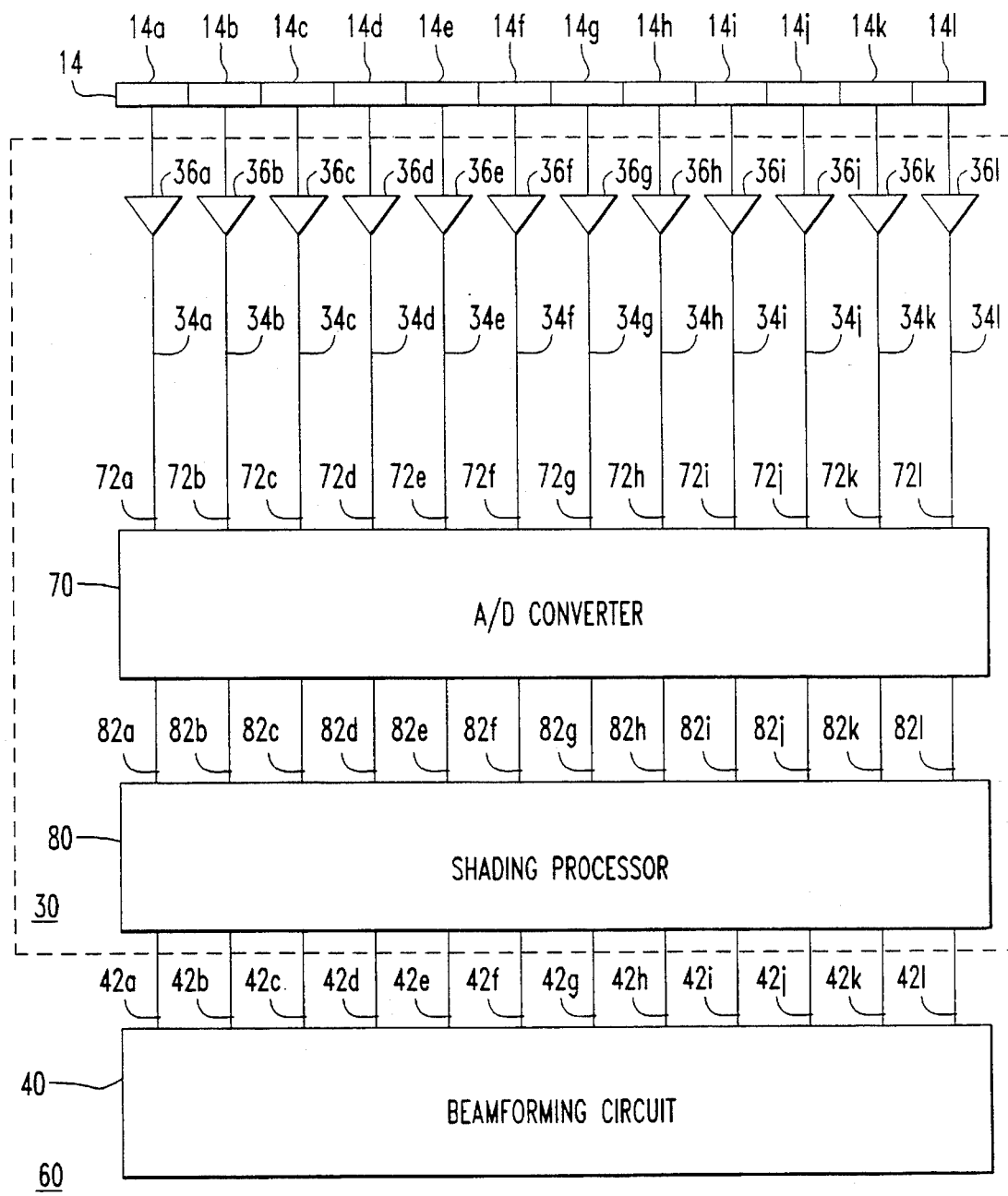
FIG. 7 is a block diagram illustrating a second embodiment of a multibeam side-look sonar system for grating side lobe reduction, in accordance with the present invention.

A second exemplary embodiment of the multibeam side-look sonar system of the present invention is shown in FIG. 7, and designated generally by reference numeral 60. Like the first embodiment shown in FIG. 2, system 60 includes projecting transducer 12, receiving transducer 14, a shading circuit 30, and a beamforming circuit 40. The shading circuit 30 includes a plurality of amplifier channels 34a–34l having amplifiers 36a–36l that amplify beam signals generated by transducer elements 14a–14l with respective gains. According to this second embodiment, however, the shading circuit 30 also includes an analog-to-digital converter 70, having inputs 72a–72l coupled to amplifier channels 34a–34l, that generates digital representations of the beam signals amplified by the amplifier channels 34a–34l. A shading processor 80 receives the digital representations of the beam signals at inputs 82a–82l, and multiplies the digital representations, to effectively amplify the beam signals with respective gains. The shading processor 80 is programmed to adjust the respective gains to reduce the amplitude level of the insonified grating side lobe 54d in the beam pattern formed by beamforming circuit 40, which receives the resultant beam signals from shading processor 80 via inputs 42a–42l. The shading processor 80 adjusts the respective gains, as in the first embodiment, to achieve a shading as shown in FIG. 6, in which the gain distribution is greater for transducer elements on the side of the main lobe 50d opposite the insonified grating side lobe 54d. However, according to the second embodiment, the shading is adjusted digitally.

Figure 8A:
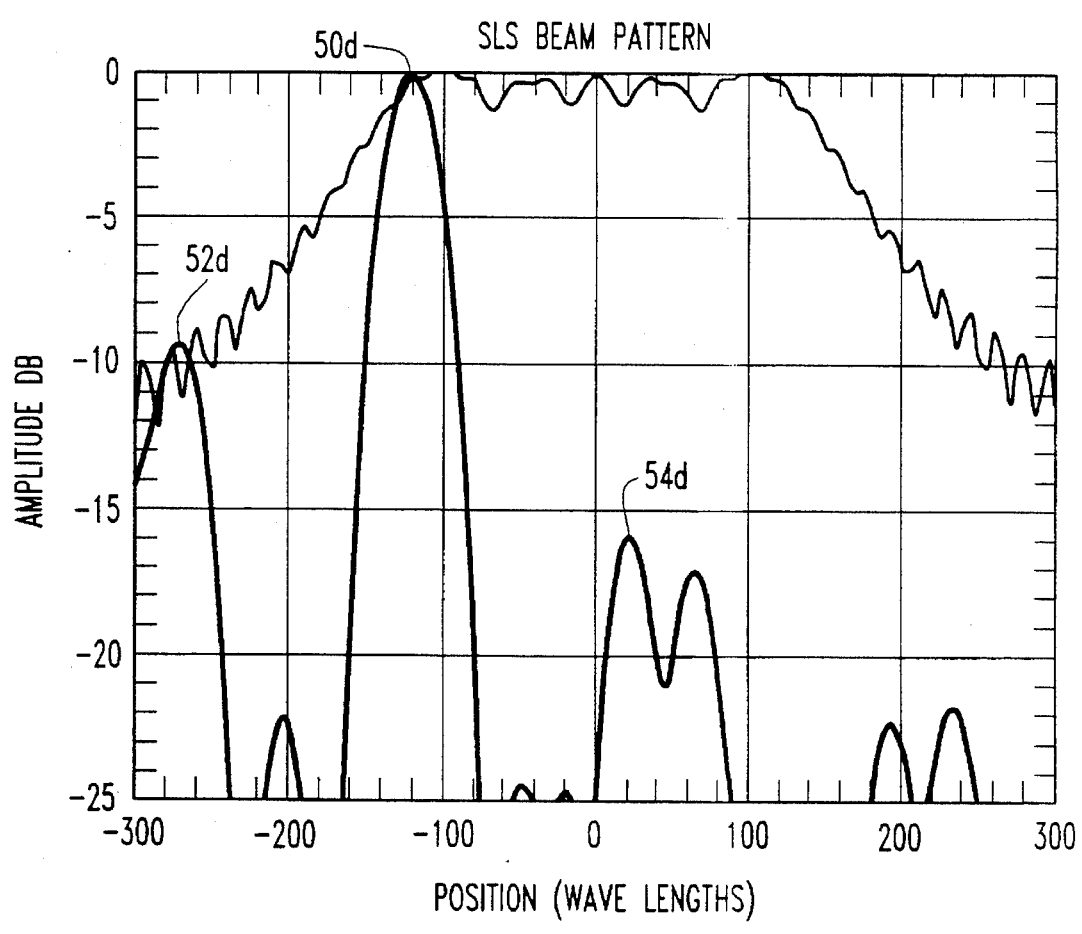
FIG. 8A is a transmitted beam pattern for the multibeam side-look sonar system of the present invention.
Figure 8B:
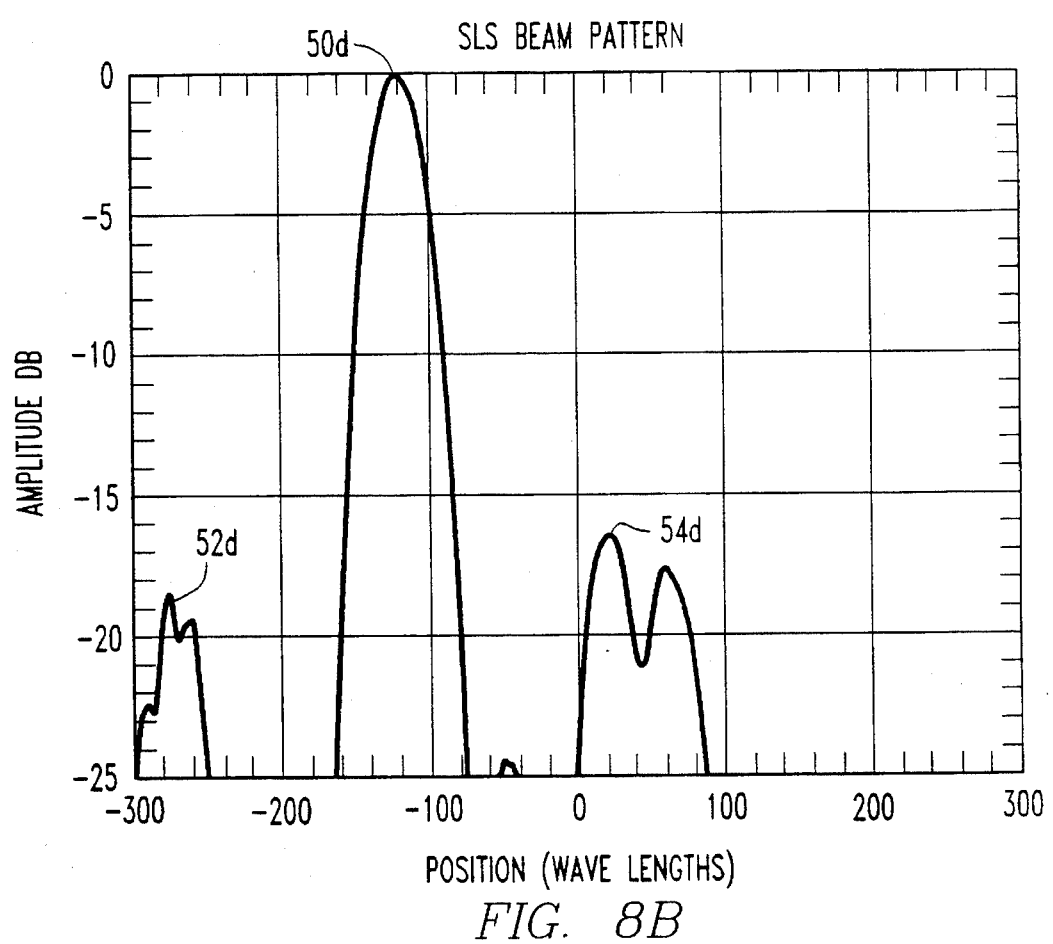
FIG. 8B is a receive beam pattern for an end beam of the multibeam side-look sonar system of the present invention.

FIGS. 8A–8B illustrate the benefits achieved by a multibeam side-look sonar system constructed according to the present invention in reducing the undesirable effects of an insonified grating side lobe in the beam pattern.

FIG. 8A shows the receive end beam pattern centered on element 14d overlaid on the transmit beam pattern and FIG. 8B shows the composite 2-way transmit/receive pattern for this beam, when the shading scheme from the embodiment of this invention is employed. The amplitude of the left grating side lobe 52d falling outside the transmit beam is allowed to increase to about −9 dB in FIG. 8A, whereas the amplitude of the right grating side lobe 54d is reduced to about −16 dB. As shown in FIG. 8B both grating side lobes are at acceptable levels and the worst one is about 3 dB better than that of the conventional practice shown in FIG. 5B.

Having described the presently preferred embodiments of the invention, additional advantages and modifications will readily occur to those skilled in the art from consideration of the specification and practice of the invention disclosed herein. Therefore, the specification and examples should be considered as exemplary only, with the true scope and spirit of the invention being indicated by the following claims.

We claim:

1. A multibeam side-look sonar system comprising:

a projecting transducer for projecting a beam of acoustic energy to insonify a target area;

a receiving transducer having a plurality of transducer elements arranged in a linear array, each of said transducer elements generating a beam signal in response to acoustic energy reflected from said target area;

a beamforming circuit, coupled to said receiving transducer, for processing the beam signals generated by said transducer elements to form a beam pattern, said beam pattern including a main lobe and grating side lobes, wherein one of said grating side lobes is insonified by the projected beam of acoustic energy; and a shading circuit, coupled between said receiving transducer and said beamforming circuit, for amplifying said beam signals with respective gains, and for adjusting each of said respective gains to reduce an amplitude level of said one of said grating side lobes insonified by said projected beam of acoustic energy.

2. The multibeam side-look sonar system of claim 1, wherein said plurality of transducer elements includes at least a first transducer element, said main lobe being substantially centered on said first transducer element, a second transducer element having a first side positioned adjacent a first side of said first transducer element opposite said one of said grating side lobes insonified by said projected beam of acoustic energy, and a third transducer element having a first side positioned adjacent a second side of said first transducer element opposite said first side, and wherein said shading circuit adjusts the respective gains such that the beam signal generated by said first transducer element is amplified with a first gain, the beam signal generated by said second transducer element is amplified with a second gain less than or equal to said first gain, and the beam signal generated by said third transducer element is amplified with a third gain less than said second gain.

3. The multibeam side-look sonar system of claim 2, wherein said plurality of transducer elements further includes a fourth transducer element having a first side positioned adjacent a second side of said second transducer element, and a fifth transducer element having a first side positioned adjacent a second side of said third transducer element, and wherein said shading circuit adjusts said respective gains such that the beam signal generated by said fourth transducer element is amplified with a fourth gain less than or equal to said third gain, and the beam signal generated by said fifth transducer element is amplified with a fifth gain less than said fourth gain.

4. The multibeam side-look sonar system of claim 1, wherein said shading circuit comprises:

a plurality of amplifier channels for amplifying said beam signals with said respective gains, each of said amplifier channels coupled between one of said transducer elements and said beamforming circuit, and a shading control circuit, coupled to each of said amplifier channels, for adjusting the respective gain of each of said amplifier channels to reduce the amplitude level of said one of said grating side lobes insonified by said beam of acoustic energy.

5. The multibeam side-look sonar system of claim 4, wherein said plurality of transducer elements includes at least a first transducer element, said main lobe being substantially centered on said first transducer element, a second transducer element having a first side positioned adjacent a first side of said first transducer element opposite said one of said grating side lobes insonified by said projected beam of acoustic energy, and a third transducer element having a first side positioned adjacent a second side of said first transducer element opposite said first side, and wherein said shading control circuit adjusts said respective gains of said amplifier channels such that the beam signal generated by said first transducer element is amplified with a first gain, the beam signal generated by said second transducer element is amplified with a second gain less than or equal to said first gain, and the beam signal generated by said third transducer element is amplified with a third gain less than said second gain.

6. The multibeam side-look sonar system of claim 5, wherein said plurality of transducer elements further includes a fourth transducer element having a first side positioned adjacent a second side of said second transducer element, and a fifth transducer element having a first side positioned adjacent a second side of said third transducer element, and wherein said shading control circuit adjusts said respective gains of said amplifier channels such that the beam signal generated by said fourth transducer element is amplified with a fourth gain less than or equal to said third gain, and the beam signal generated by said fifth transducer element is amplified with a fifth gain less than said fourth gain.

7. The multibeam side-look sonar system of claim 1, wherein said shading circuit comprises:

a plurality of amplifier channels for amplifying said beam signals, each of said amplifier channels coupled to one of said transducer elements, an analog-to-digital converter for generating digital representations of said beam signals amplified by said amplifier channels, and a shading processor for amplifying said digital representations with respective gains, and for adjusting said respective gains to reduce the amplitude level of said one of said grating side lobes insonified by said projected beam of acoustic energy.

8. The multibeam side-look sonar system of claim 7, wherein said plurality of transducer elements includes at least a first transducer element, said main lobe being substantially centered on said first transducer element, a second transducer element having a first side positioned adjacent a first side of said first transducer element opposite said one of said grating side lobes insonified by said projected beam of acoustic energy, and a third transducer element having a first side positioned adjacent a second side of said first transducer element opposite said first side, and wherein said shading processor adjusts said respective gains such that the beam signal generated by said first transducer element is amplified with a first gain, the beam signal generated by said second transducer element is amplified with a second gain less than or equal to said first gain, and the beam signal generated by said third transducer element is amplified with a third gain less than said second gain.

9. The multibeam side-look sonar system of claim 8, wherein said plurality of transducer elements further includes a fourth transducer element having a first side positioned adjacent a second side of said second transducer element, and a fifth transducer element having a first side positioned adjacent a second side of said third transducer element, and wherein said shading processor adjusts said respective gains such that the beam signal generated by said fourth transducer element is amplified with a fourth gain less than or equal to said third gain, and the beam signal generated by said fifth transducer element is amplified with a fifth gain less than said fourth gain.

* * * * *